United States Patent
Junk

(10) Patent No.: US 9,188,140 B2
(45) Date of Patent: Nov. 17, 2015

(54) BYPASS ARRANGEMENT FOR VALVE ACTUATOR

(75) Inventor: Kenneth W. Junk, Marshalltown, IA (US)

(73) Assignee: FISHER CONTROLS INTERNATIONAL LLC, Marshalltown, IA (US)

(*) Notice: Subject to any disclaimer, the term of this patent is extended or adjusted under 35 U.S.C. 154(b) by 861 days.

(21) Appl. No.: 13/414,892

(22) Filed: Mar. 8, 2012

(65) Prior Publication Data
US 2012/0228530 A1    Sep. 13, 2012

Related U.S. Application Data

(60) Provisional application No. 61/450,484, filed on Mar. 8, 2011.

(51) Int. Cl.
F16K 31/122 (2006.01)
F15B 15/20 (2006.01)

(52) U.S. Cl.
CPC ............ F15B 15/202 (2013.01); F16K 31/122 (2013.01); *F15B 2211/3057* (2013.01); *F15B 2211/3058* (2013.01)

(58) Field of Classification Search
CPC . F16K 31/122; F16K 31/1221; F15B 15/202; F15B 2211/3057; F15B 2211/3058; F15B 13/10
USPC ................. 251/31, 14; 91/437, 465
See application file for complete search history.

(56) References Cited

U.S. PATENT DOCUMENTS

| | | | | |
|---|---|---|---|---|
| 1,499,316 | A | * | 6/1924 | Oliphant ........................ 417/115 |
| 2,690,085 | A | * | 9/1954 | Freeman .......................... 74/625 |
| 2004/0200349 | A1 | * | 10/2004 | Moler et al. .................... 91/465 |
| 2005/0229775 | A1 | | 10/2005 | Junk |
| 2009/0283160 | A1 | | 11/2009 | Fishwick et al. |

FOREIGN PATENT DOCUMENTS

FR    755 791 A    11/1933

OTHER PUBLICATIONS

International Search Report for PCT/US2012/023820, dated May 31, 2012.
Written Opinion for PCT/US2012/023820, dated May 31, 2012.
International Preliminary Report on Patentability for Application No. PCT/US2012/023820, dated Sep. 10, 2013.
European Office Action issued in Application No. 12709727.7-1754, dated Dec. 18, 2014.

* cited by examiner

*Primary Examiner* — John K Fristoe, Jr.
*Assistant Examiner* — Andrew J Rost
(74) *Attorney, Agent, or Firm* — Marshall, Gerstein & Borun LLP

(57) ABSTRACT

A bypass arrangement in accordance with an embodiment of the invention includes an actuator movable in a first direction and a second direction, a volume booster in fluid communication with the actuator, the volume booster having a supply passage, an exhaust passage, and a volume booster output bypass connection in fluid communication with the supply passage, and a bypass valve in fluid communication with the volume booster output bypass connection.

15 Claims, 7 Drawing Sheets

BYPASS ARRANGEMENT FOR VALVE ACTUATOR

CROSS-REFERENCE TO RELATED APPLICATION

The benefit under 35 U.S.C. §119(e) of U.S. Provisional Patent Application No. 61/450,484 filed Mar. 8, 2011, is hereby claimed, and the disclosure is incorporated herein by reference in its entirety.

FIELD OF THE DISCLOSURE

The present disclosure relates generally to a volume booster arrangement. More specifically, the present disclosure relates to a volume booster output bypass connection that can allow for direct mounting of the volume booster on an actuator.

BACKGROUND

Control valve systems for controlling the flow of liquids and/or gasses in a process system are generally known in the art. These systems generally employ an actuator to open and close the control valve. The position of the control valve is generally controlled by a positioner. Volume boosters are generally included in the control valve system to improve the stroking speed of the actuator.

Manual override of the positioner to allow for manual control of the actuator and override of the positioner generally requires the use of a bypass value in fluid communication with the actuator. The bypass valve allows the pressure in the actuator to equilibrate, so that manual operation of the actuator is possible. For example, in a piston actuator, the bypass valve is generally disposed between first and second chamber portions of the cylinder. Once the pressure in the upper and lower cylinders has reached equilibrium, the piston is freely moveable in response to a manual operating device, such as a hand wheel.

FIG. 1 shows a typical bypass arrangement with a pneumatic bypass on a piston actuator. The bypass valve 10 is connected to the boosters 12, 14 and the actuator 16 by a tee 18 and pipe nipple 20. FIG. 2 shows a typical bypass arrangement with a hand wheel and bypass valve 10 disposed downstream of the volume booster 12. As in FIG. 1, the volume booster 12 is connected to the bypass valve 10 using a tee 18. Such arrangements create additional leak paths and increases fitting costs and assembly time.

SUMMARY

In accordance with an embodiment of the disclosure, a bypass arrangement includes an actuator movable in first and second directions, and a volume booster in fluid communication with the actuator. The volume booster includes a supply passage, an exhaust passage, and a volume booster output bypass connection in fluid communication with the supply passage. The bypass arrangement further includes a bypass valve in fluid communication with the volume booster output bypass connection In accordance with another embodiment of the invention, a bypass arrangement includes an actuator moveable in first and second directions, and first and second volume boosters in fluid communication with the actuator. The first and second volume boosters each include first and second supply passages, first and second exhaust passages, and first and second volume booster output bypass connections in fluid communication with the first and second supply passages. The bypass arrangement further includes a bypass valve in fluid communication with the first and second volume booster output bypass connections.

In accordance with yet another embodiment of the disclosure, a control valve assembly includes a valve; an actuator moveable in first and second directions and fluidly coupled to the valve, the actuator configured to move the valve in first and second directions; a first volume booster in fluid communication with the actuator, the first volume booster having a first supply passage, a first exhaust passage, and a first volume booster output bypass connection in fluid communication with the first supply passage; a second volume booster in fluid communication with the actuator, the second volume booster having a second supply passage, a second exhaust passage, and a second volume booster output bypass connection in fluid communication with the second supply passage; and a bypass valve in fluid communication with the first and second volume booster output bypass connections.

DETAILED DESCRIPTION OF THE PREFERRED EMBODIMENTS

Although the following text sets forth a details description of an exemplary embodiment of the invention, it should be understood that the legal scope of the invention is defined by the words of the claims set forth at the end of this patent. The detailed description is to be construed as exemplary only and does not describe every possible embodiment of the invention since describing every possible embodiment would be impractical, if not impossible. Based upon reading this disclosure, those of skill in the act may be able to implement one or more alternative embodiments, using either current technology or technology developed after the filing date of this patent. Such additional indictments would still fall within the scope of the claims defining the invention.

The term "fluid" is used herein in the engineering sense, and can include at least liquids and gases.

Figure 3:
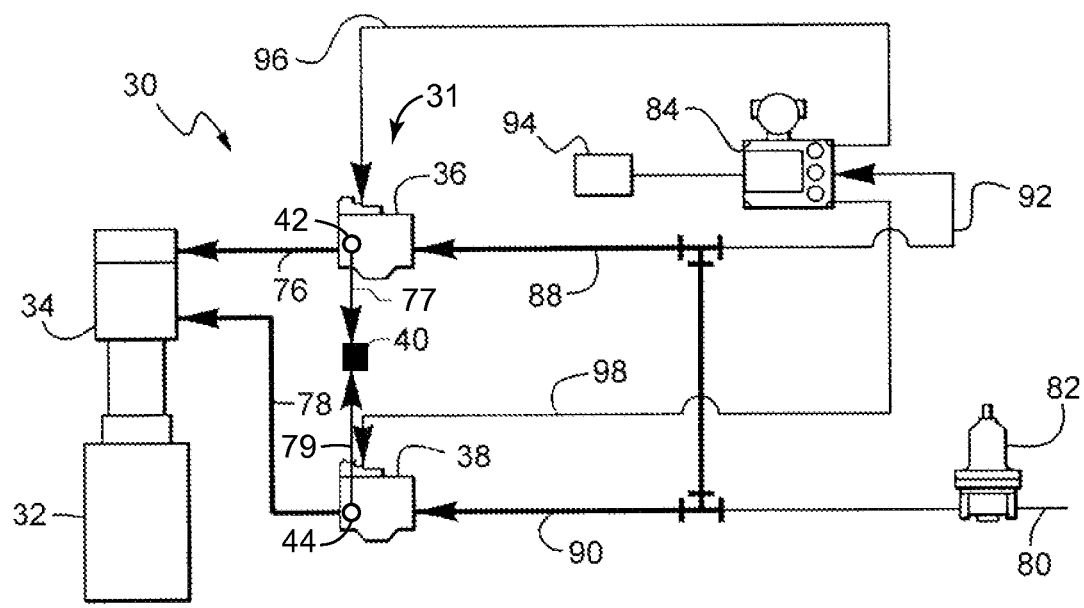
FIG. 3 is a schematic of a control valve assembly employing a piston-type actuator and a bypass arrangement in accordance with the disclosure.

Referring to FIG. 3, a control valve assembly 30 using a bypass arrangement 31 constructed in accordance with the teachings of the invention can include a valve 32, an actuator 34 disposed adjacent the valve 32 and configured to move the valve 32 between first and second positions, first and second volume boosters 36, 38 in fluid communication with the actuator 34, and a bypass valve 40 in fluid communication with volume booster output bypass connections 42, 44 disposed on the first and second volume booster 36, 38. For example, as described in more detail below, the first and second volume boosters 36, 38 can be fluidly coupled to the actuator 34 using connections 76, 78, or the volume boosters 36, 38 can be directly mounted onto the actuator 34. The volume booster output bypass connections 42, 44 can, for example, be fluidly coupled to the bypass valve 40 using connections 77, and 79 respectively. The bypass valve 40 can be opened to allow the pressure in the actuator 34 to equalize, which allows for manual operation of the actuator 34.

Figure 4:
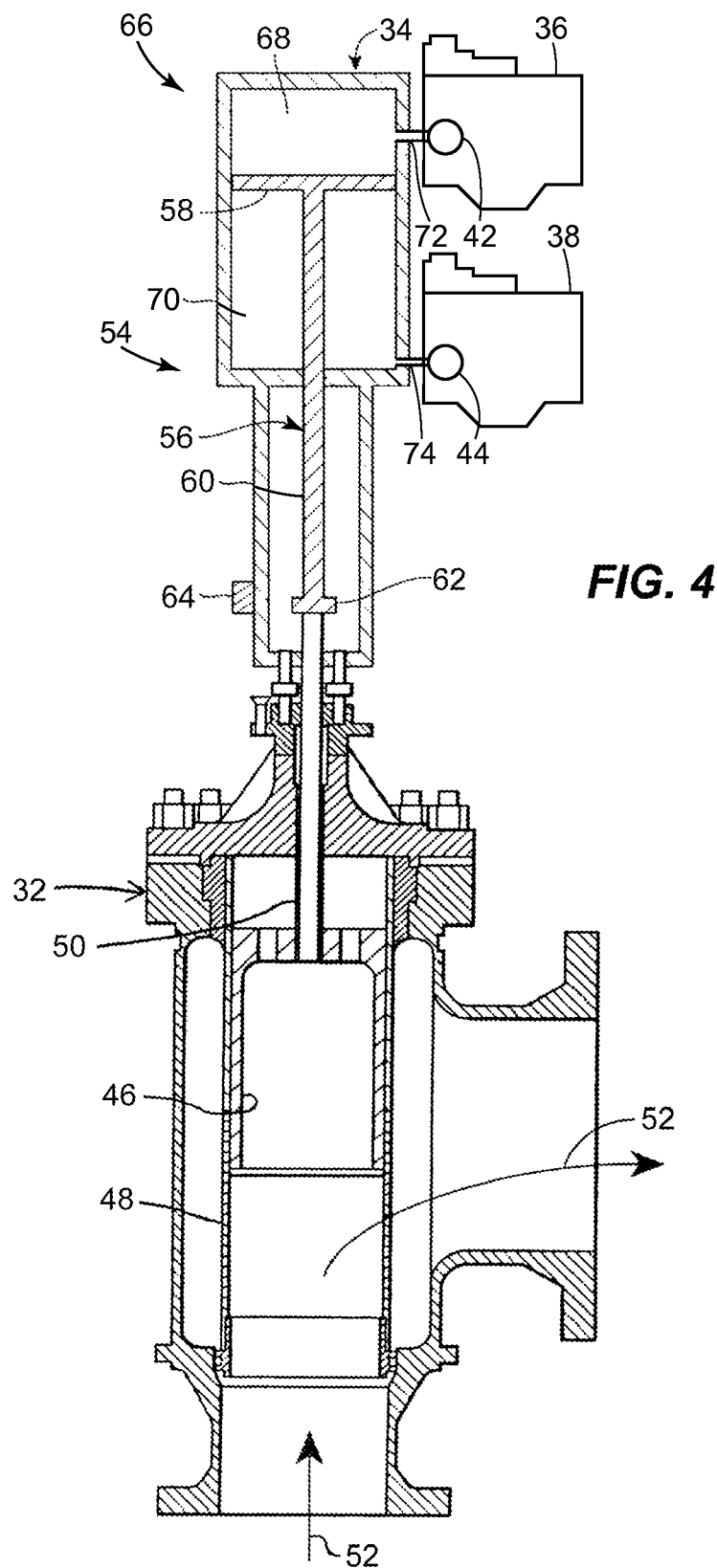
FIG. 4 is a cross-sectional view of the actuator of FIG. 1, showing first and second volume boosters directly mounted on the actuator.

Referring to FIG. 4, the valve 32 includes a valve plug 46 movably disposed in a cage 48 within the valve 32. The cage 48 is perforated such that fluid can pass through the cage 48. The plug 46 is connected to a stem 50, and is moveable between a first position shown in FIG. 4 in which the passage 52 is open and fluid can flow through the perforations in the cage 48, and a second position in which the plug 46 is moved downward and blocks the perforations in the cage 48 such that fluid cannot flow through the passage 52. Further, the valve 32 can act as a throttling valve so that the plug 46 can be located anywhere in between the first and second positions to control fluid flow through the valve 32.

An actuator 34 is disposed adjacent the valve 32 and is configured to move the valve 32 between the first and second positions. The actuator 34 can include, for example, a cylinder 54 in which a piston rod 56 slides. The piston rod 56 includes a piston 58 and an actuator yoke 60. The yoke 60 is operatively connected to the stem 50 via a stem connector 62, such that when the piston 58 moves, the plug 46 likewise moves. A control element 64 is disposed adjacent the stem connector 62 and can sense the position of the plug 46.

The piston 58 slides within a chamber 66 of the cylinder 54. The piston 58 divides the chamber 66 into a first chamber and second portions 68, 70 that are generally sealed from each other by the piston 58. A first port 72 allows the introduction of a fluid into the first chamber portion 68 and a second port 74 allows the introduction of a fluid into the second chamber portion 70.

As is known, to close the passage 52 with the valve 32, pressurized fluid can be introduced into the first chamber portion 68 through the first port 72, and fluid in the second chamber portion 70 can be released through the second port 74. The piston 58 and plug 46 are then forced downward, closing the passage 52. To open the passage 52, pressurized fluid is introduced into the second chamber portion 70 through the second port 74, and the fluid in the first chamber portion 68 can be released through the first port 72. The piston 58 and plug 46 are forced upward, opening the passage 52.

The first chamber portion 68 is in fluid communication with a first volume booster 36. The second chamber portion 70 is in fluid communication with a second volume booster 38. Fluid supplied by the first volume booster 36 travels through the first port 72 and into the first chamber portion 68. Likewise, fluid supplied by the second volume booster 38 travels through the second port 74 into the second chamber portion 70. In the arrangement shown in FIG. 4, the first and second volume boosters 36, 38 are directed mounted onto the actuator 34. Alternatively, the first and second volume boosters 36, 38 can be in fluid communication with the first and second chamber portions 68, 70 via first and second connections 76, 78 (as shown in FIG. 3). The first and second connections 76, 78 can be made for example of a pipe nipple, or other types of connections, such as flexible or rigid plastic.

Referring back to FIG. 3, a main supply line 80 is connected to a regulator 82 and supplies the regulator 82 with pressurized fluid from a pressure source such as an air compressor. The regulator 82 is in fluid communication with and supplies pressurized fluid to the first volume booster 36, the second volume booster 38, and a positioner 84 via a first booster supply line 88, a second booster supply line 90, and a positioner supply line 92, respectively. Again, these supply lines can be made of metal tubing, rigid or flexible plastic tubing, or the like. The regulator 82 can regulate the pressure of the fluid supplied to these components.

The positioner 84 is in electrical communication with an input center 94. The positioner 84 receives commands from the input center 94 directing it to move the valve 32 to a desired position, i.e., the closed position, the open position, or anywhere in between. The positioner 84 can be in electrical communication with the input center 94, and is able to determine the position of the plug 46 within the valve 32. The positioner 84, selectively using the first and second volume boosters 36, 38, directs the movement of the valve 32 in a manner discussed herein.

The positioner 84 is in fluid communication with the first volume booster 36 via a first positioner output line 96, and is in fluid communication with the second volume booster 38 via a second positioner output line 98. The positioner 84 receives the electrical command input from the input center 94 and converts this electrical signal to pneumatic signals. The positioner 84 uses the pressurized fluid from the regulator 82 to deliver the first pneumatic signal through the first output line 96 to the first volume booster 36 and the second pneumatic signal through the second output line 98 to the second volume booster 38.

If the command input from input center 94 directs the positioner 84 to open the valve 32 in a non-urgent manner, the positioner 84 supplies pressurized fluid through the second volume booster 38 to the second chamber portion 70 (shown in FIG. 4) of the actuator 34, and the positioner 84 allows pressurized fluid to flow from the first chamber portion 68 (shown in FIG. 4), through the first volume booster 36, to be discharged to the atmosphere or a third reservoir. If the command input directs the valve 32 to close, the reverse occurs.

As is known in the art, if the signal from the input center 94 directs the positioner 84 to rapidly open the valve 32 under a surge condition, the second pneumatic signal flows through the second volume booster 38 to the second chamber portion 70. The second signal also activates the second volume booster 38 as will be described herein such that a large volume of pressurized fluid flows through the second booster supply line 90 through the second volume booster 38 to the second chamber portion 70, thereby rapidly opening the valve 32.

Figure 5:
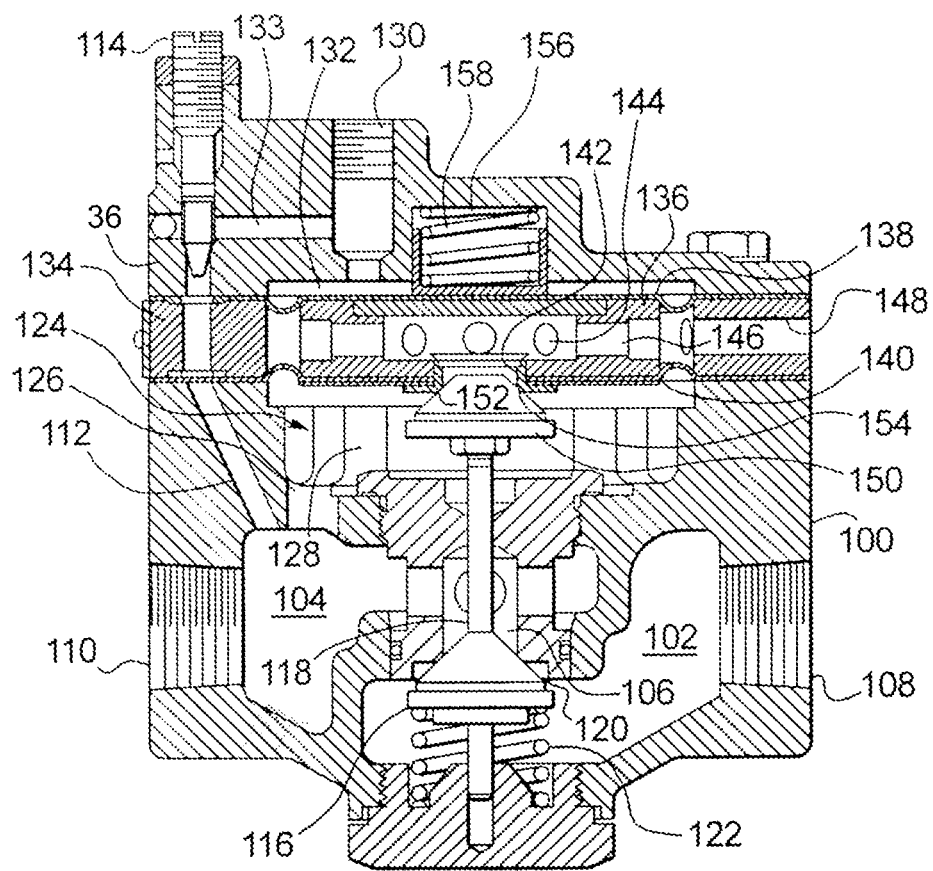
FIG. 5 is a cross-section view of the volume booster having a volume booster output bypass connection in accordance with the disclosure.

The volume boosters 36, 38 can function as is known in the art. For example the volume boosters 36, 38, can function as described in U.S. Pat. No. 7,458,310, the entire disclosure of which is incorporated herein by reference. Referring to FIG. 5, the first volume booster 36 generally includes a casing or body 100 having an inlet or supply chamber 102 and an output chamber 104 in communication with one another via a supply port 106 within the body 100. The supply chamber 102 has a supply opening 108 at one end that is open to the exterior of the body 100. The supply chamber 102 is in communication with the supply port 106 at its interior end. The output chamber 104 communicates with the supply port 106 at an interior end of the output chamber 104 and opens to the exterior of the body 100 at an output opening 110. The supply chamber 102 and supply opening 108 are in fluid communication with the regulator 82 (shown in FIG. 3) via the first booster supply line 88. The output chamber 104 is in fluid communication with an actuator 34, and can be fluidly coupled with the actuator 34 using the first connection 76 (as shown in FIG. 3) or directly coupled to the first port 72 of the actuator 34 (as shown in FIG. 4, when the volume booster 36 is directly mounted on the actuator 34).

A bypass restriction passage 112 is in communication with the output passage 104 and has an adjustment screw 114. The bypass adjustment screw 114 can be adjusted to permit small volumes of fluid to travel from the positioner 84, through the first volume booster 36, and to the first chamber portion 68 of the actuator 34, as discussed below, while avoiding implementation of the volume boost function. A larger pressure differential across the first volume booster 36 will actuate the volume booster 36 as discussed below.

A supply valve 116 is positioned within the supply chamber 102 adjacent the supply port 106. The supply valve 116 is carried in this example integrally on a portion of a stem 118 and is biased relatively tightly to a closed position against a seat 120 of the supply port 106 by a spring 122. The spring 122 is simply a safety feature to assure the supply valve 116 remains closed when the volume booster 36 is not operating or if a valve 32 system failure were to occur.

A cavity 124 is provided within the body 100 above the chambers 102 and 104 and the supply port 106 in this example. A first exhaust port 126 is provided in fluid communication between an exhaust chamber section 128 of the cavity 124 and the output chamber 104 downstream of the supply port 106. An input signal port 130 is in fluid communication between the first booster supply line 88 from the positioner 84 and an upper signal chamber section 132 of the cavity 124.

A bypass port 133 provides fluid communication between the bypass passage 112 and the input signal port 130. When the positioner 84 sends pressurized fluid to the first volume booster 36 through the input signal port 130 to close the valve 32, the fluid travels into the upper signal chamber 132 and through the bypass port 133. If the pressure of the fluid is not high enough to activate the first volume booster 36, as will be described herein, the fluid travels through the bypass port 133 and the bypass restriction passage 112, and into the output chamber 104. From there the fluid travels to the actuator 34 to close the valve 32. Since the first volume booster 36 has not been activated, the closing of the valve 32 takes a comparatively long time.

A floating diaphragm assembly 134 is positioned within the cavity 124 and separates the cavity 124 into the exhaust and signal chambers 128 and 132, respectively, and functions as a poppet valve 32. The diaphragm assembly 134 includes a floating manifold 136 sandwiched between a pair of diaphragms 138 and 140. The upper diaphragm 138 is called an instrument diaphragm and defines the signal chamber 132. The lower diaphragm 140 is called a feedback diaphragm and defines the exhaust chamber 128. The manifold 136 includes a central opening 142 and a plurality of radial passages 144 extending radially outward therefrom. The radial passages 144 are in fluid communication with an annular passage 146 extending around the manifold 136 between the diaphragms 138 and 140. The annular passage 146 is in further fluid communication with an exhaust outlet 148 venting to atmosphere outside the body 100.

An exhaust valve 150 is carried on the valve stem 118 opposite the supply valve 116. A second exhaust port 152 is provided in the bottom of the manifold 136 and provides communication between the exhaust chamber 128 and the central opening 142 of the manifold 136. The exhaust valve 150 bears against a seat 154 to close off the second exhaust port 152. A spring cavity 156 is provided above the diaphragm assembly 134 and houses a spring 158 that biases the floating assembly 134 downward against the exhaust valve 150 to close the second exhaust port 152. When the exhaust valve 150 is closed, the exhaust chamber 128 is not in communication with the exhaust outlet 148. When open, the outlet chamber 104 of the volume booster 36 is in fluid communication with the exhaust outlet 148 through the exhaust chamber 128 and diaphragm manifold 136.

The second volume booster 38 can be substantially the same as the first volume booster 36. Alternatively, the second volume booster 38 can include a first exhaust port having a smaller cross sectional area than that of the first volume booster 36. See U.S. Pat. No. 7,458,310.

Figure 6A:
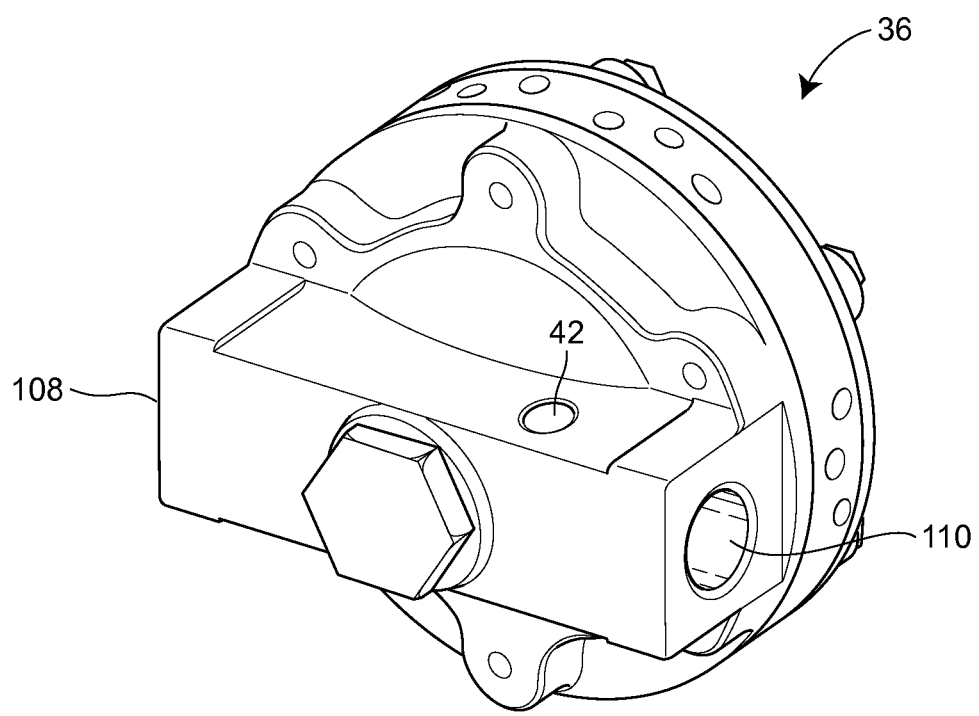
FIG. 6A is an exterior view a volume booster having a volume booster output bypass connection in accordance with an embodiment of the disclosure.
Figure 6B:
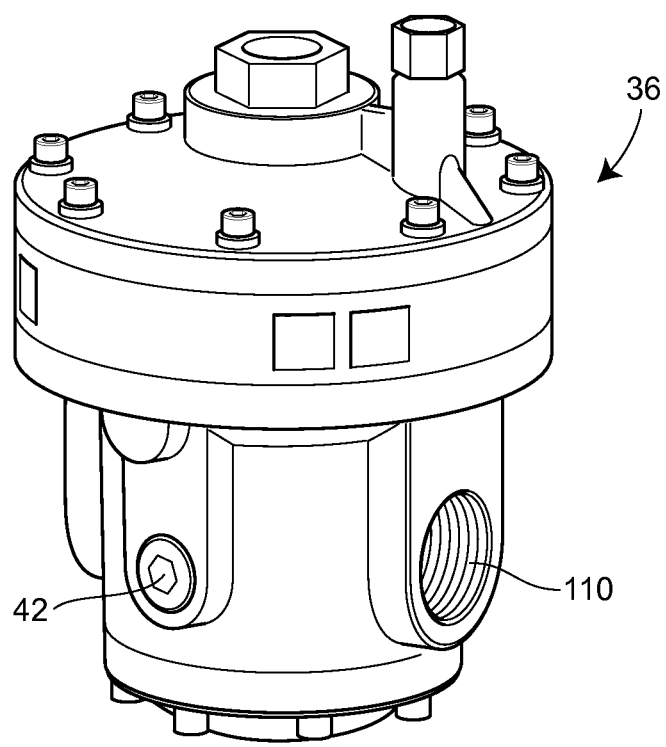
FIG. 6B is an exterior view of a volume booster having a volume booster output bypass connection in accordance with another embodiment of the disclosure.

Referring to FIGS. 6A and 6B, the volume boosters 36, 38 each include a volume booster output bypass connection 42, 44 in fluid communication with the booster output 110. The volume booster output bypass connections 42, 44 can be disposed on one or more sides of the volume boosters 36, 38 to accommodate for various installation arrangements of the volume boosters 36, 38 in the control valve assembly 30.

Figure 7:
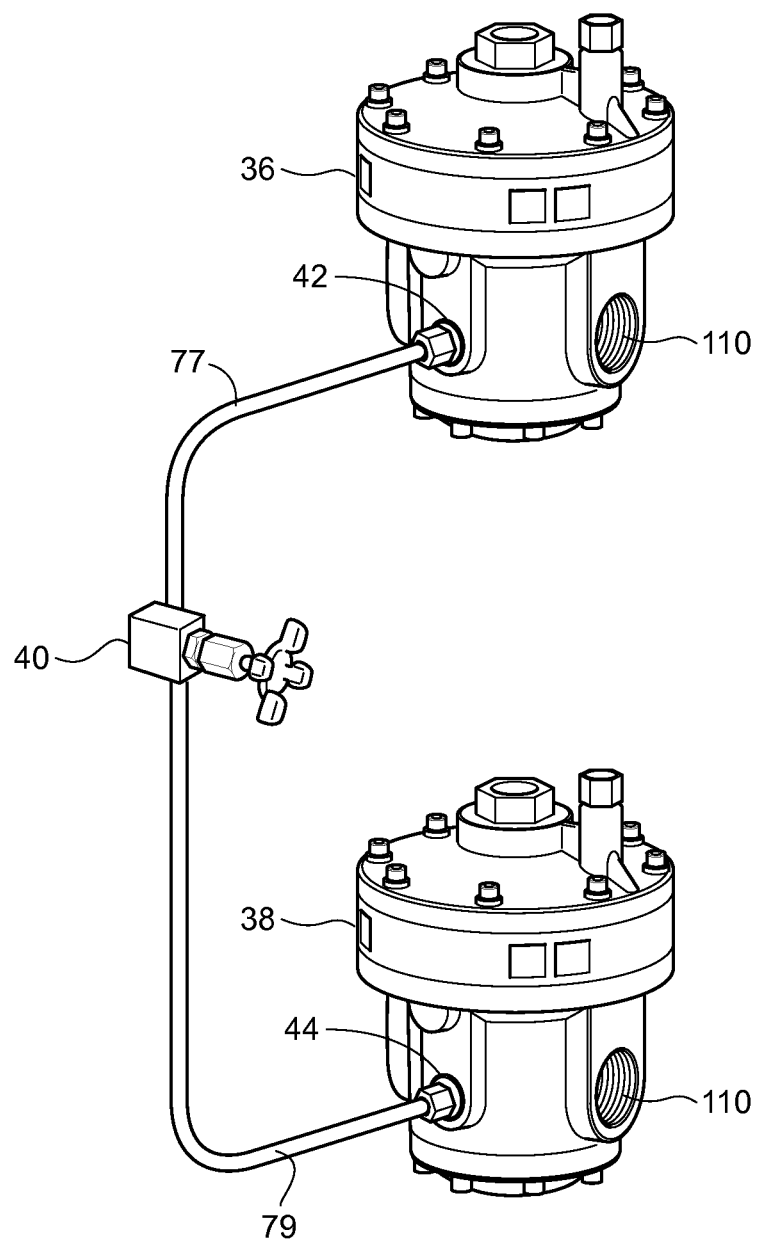
FIG. 7 is an exterior view of a volume booster arrangement in accordance with the disclosure.

Referring to FIG. 7, a bypass valve 40 can be fluidly coupled to the volume booster output bypass connections 42, 44 of the first and second boosters 36, 38. For example, connections 77, 79 can be piped from the volume booster output bypass connections 42, 44 to the bypass valve 40. For the control valve assembly 30 shown in FIG. 3, a connection can be piped from the volume booster output bypass connections 42, 44 of the first and second volume boosters 36, 38 to the bypass valve 40 to allow the pressure in the first and second chamber portions 68, 70 of the actuator 34 equilibrate. Alternatively, as shown in FIG. 4, the volume boosters 36, 38 can be directly mounted onto the actuator 34. As discussed in detail below, during normal operation the bypass valve 40 remains closed. During manual operation of the actuator 34, however, the bypass valve 40 is opened to equilibrate the pressures in the first and second chamber portions 68, 70 to allow for manual movement of the actuator 34. The bypass valve 40 can be for example a needle valve. Alternatively, the bypass valve 40 can be a pneumatic bypass.

Additionally, the volume booster output bypass connections 42, 44 can be used with positioner diagnostic systems (not shown) to monitor actual actuator 34 pressure.

Referring back to FIG. 5, during normal operation, the positioner 84 delivers a pneumatic signal converted from electrical impulses based on the position of the actuator 34. The pressure signal is delivered to the signal port 130 and, thus, to the signal chamber 132 of the volume booster 36 (reference to the first volume booster 36 is made by way of example only). Further, a steady supply pressure is provided to the supply chamber 102 by the regulator 82. The output chamber 104 is connected to the actuator 34.

A pressure differential across the volume booster 36 occurs between the signal chamber 132 and the exhaust chamber 128 and thus the output chamber 104 (via the first exhaust port 126). If the pressure differential across the volume booster 36 is insubstantial, as determined by the booster bypass adjustment and as desired, each valve 116 and 150 remains closed. The diaphragm assembly 134 will be in a static unloaded position with each valve 116 and 150 born against its respective seat 120 and 154. The respective springs 122 and 158 assist in biasing the valves 116, 150 closed in an insubstantial or zero differential condition. A substantial pressure differential is one that is great enough to affect the diaphragm assembly 134, whether up or down, and will move the supply valve 116 and exhaust valve 150 in unison because each is fixed to the stem 118.

During operation, a positive differential condition is achieved when pressure is substantially greater in the signal chamber 132 than the output chamber 104. The positioner 84 delivers a high pressure signal to the signal port 130. The floating diaphragm assembly 134 is forced downward by the pressure differential upon the exhaust valve 150, keeping the second exhaust port 152 closed and opening the supply valve 116. Thus, the first volume booster 36 provides a volume of pressurized air to the actuator 34 from the supply chamber 102 via the output chamber 104. The output of the volume booster 36 is also registered on the diaphragm assembly 134 through the exhaust port 126. When the pressure in the output chamber 104 rises to the pressure in the signal chamber 132, the supply valve 116 rises up and closes off.

When pressure is substantially lower in the signal chamber 132 than the output chamber 104, a negative pressure differential is achieved. For example, the positioner 84 may issue a corrective pneumatic input signal to the signal port 130 that is at a relatively low pressure. The floating diaphragm assembly 134 and valve stem 118 will rise. The supply valve 116, if not already closed, will close off the supply port 106. Once closed, the stem 118 and valves 116 and 150 will not move further upward. Back pressure from the output chamber 104 moves the floating diaphragm assembly 134 further upward against the force of the spring 158 and opens the second exhaust port 152. Air in this example will vent to atmosphere from the output chamber 104 through the exhaust outlet 148.

Referring again to FIGS. 4 and 7, during manual override operation, the bypass valve 40 fluidly couples the first and second boosters 36, 38, and thereby allowing the first and second chamber portions 68 of the actuator 34 to be in fluid communication with each other. Accordingly, the pressure difference between the first and second chamber portions 68, 70 can equilibrate via the bypass valve 40. For example, when pressure is lower in the first chamber portion 68 as compared to the second chamber portion 70, the opening of the bypass valve 40 will cause the excess pressure in the second chamber portion 70 to flow into the booster output 110 of the second volume booster 38 and into the first chamber portion 68 via the bypass valve 40 and the booster output 110 of the first volume booster 36. Once the pressure in the first and second chamber portions 68, 70 reaches equilibrium, the piston 58 can be manually moved, for example, by a hand wheel or any other suitable manual operating device. Throughout manual operation of the actuator, the pressure within the first and second chamber portions 68, 70 remain in equilibrium via the bypass valve 40.

Figure 1:
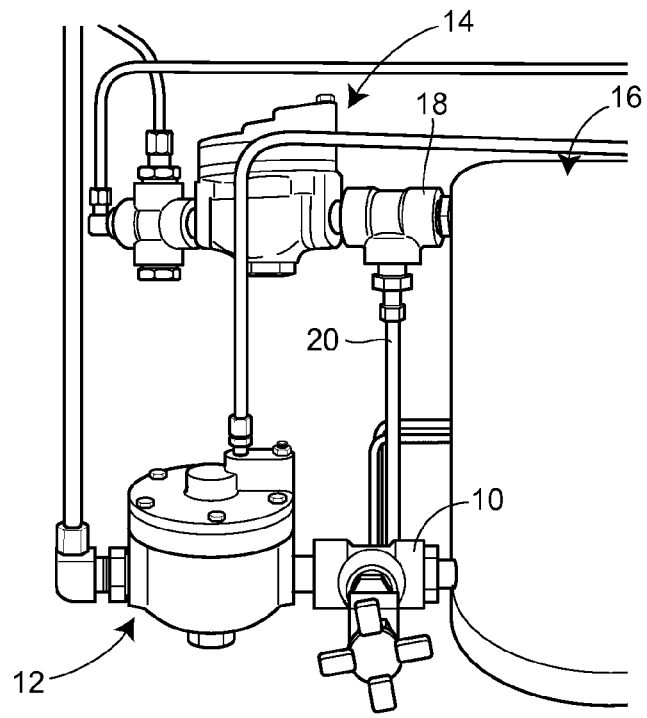
FIG. 1 is a schematic of control valve assembly with a conventional pneumatic bypass on a piston actuator, downstream of a volume booster.
Figure 2:
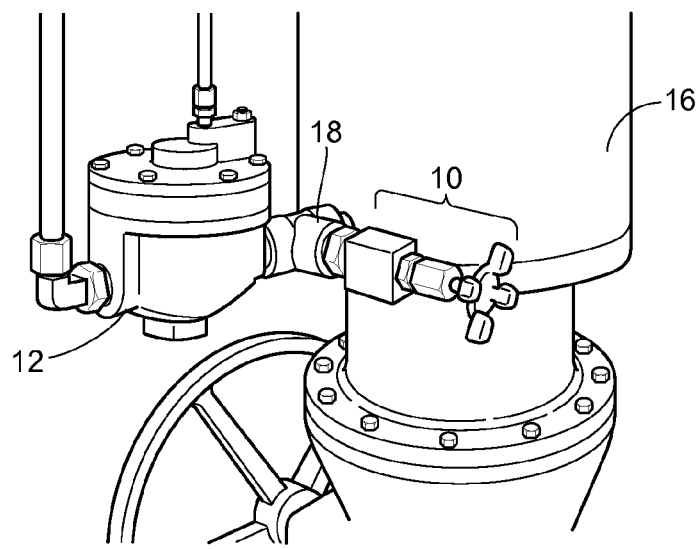
FIG. 2 is a schematic of a control valve assembly with a conventional hand wheel and bypass valve downstream of a volume booster.

The volume boosters 36, 38 having volume booster output bypass connections 42, 44 can allow for direct mounting of the volume booster 36 on the actuator 34 (as shown in FIG. 4). Direct mounting of the volume booster 36, 38 on the actuator 34 brings the center of gravity inward and can improve vibration assistance. Further, the pipe tee 18 and pipe nipple 20 used in conventional bypass arrangements (as shown in FIG. 1) to connect the volume boosters to both the actuator and the bypass valve can be eliminated, which can result in elimination of a leak path. Additionally, the bypass arrangement 31 of the invention can reduce costs and assembly time. The bypass arrangement 31 is described herein as including first and second volume boosters 36, 38. However, a bypass arrangement in accordance with the invention can include any number of volume boosters, including a single volume booster.

The preceding text sets forth a detailed description of numerous different embodiments of the invention, it should be understood that the legal scope of the invention is defined by the words of the claims set forth at the end of this patent. The detailed description is to be construed as exemplary only and does not describe every possible embodiment of the invention since describing every possible embodiment would be impractical, if not impossible. Numerous alternative embodiments could be implemented, using either current technology or technology developed after the filing date of this patent, which would still fall within the scope of the claims defining the invention.

What is claimed is:

1. A control valve assembly comprising:
   a valve;
   an actuator moveable in first and second directions and fluidly coupled to the valve, the actuator configured to move the valve in first and second directions;
   a first volume booster in fluid communication with the actuator, the first volume booster comprising a first supply passage, a first exhaust passage, and a first volume booster output bypass connection in fluid communication with the first supply passage;
   a second volume booster in fluid communication with the actuator, the second volume booster comprising a second supply passage, a second exhaust passage, and a second volume booster output bypass connection in fluid communication with the second supply passage; and
   a bypass valve in fluid communication with the first and second volume booster output bypass connections.

2. The control valve assembly of claim 1, wherein the first and second volume boosters are direct mounted onto the actuator.

3. The control valve assembly of claim 1, further comprising
   a positioner;
   a first line from the positioner to the first volume booster; and
   a second line from the positioner to the second volume booster;
   wherein the positioner signals one or more of the first and second volume boosters by supplying pressurized fluid through the first and second lines.

4. A bypass arrangement, comprising:
   an actuator movable in a first direction and a second direction;
   a volume booster in fluid communication with the actuator, the volume booster comprising a supply passage, an exhaust passage, and a volume booster output bypass connection in fluid communication with the supply passage, and
   a bypass valve in fluid communication with the volume booster output bypass connection.

5. The bypass arrangement of claim 4, wherein the bypass valve is a needle valve.

6. The bypass arrangement of claim 4, wherein the volume booster is direct mounted to the actuator.

7. The bypass arrangement of claim 4, further comprising a positioner, a line from the positioner to the volume booster, wherein the positioner signals the volume booster by supplying pressurized fluid through the line.

8. The bypass arrangement of claim 4, wherein the actuator is a piston actuator.

9. The bypass arrangement of claim 8, wherein the piston actuator is selected from the group consisting of double acting piston actuators, spring return piston actuators, and fail safe piston actuators.

10. A bypass arrangement, comprising:
- an actuator moveable in a first direction and a second direction;
- a first volume booster in fluid communication with the actuator, the first volume booster comprising a first supply passage, a first exhaust passage, and a first volume booster output bypass connection in fluid communication with the first supply passage;
- a second volume booster in fluid communication with the actuator, the second volume booster comprising a second supply passage, a second exhaust passage, and a second volume booster output bypass connection in fluid communication with the second supply passage; and
- a bypass valve in fluid communication with the first and second volume booster output bypass connections.

11. The bypass arrangement of claim 10, wherein the bypass valve is a needle valve.

12. The bypass arrangement of claim 10, wherein the first and second volume boosters are direct mounted to the actuator.

13. The bypass arrangement of claim 10, wherein the actuator comprises a chamber and a moveable piston rod disposed within the chamber and separating the chamber into first and second chamber portions, the first volume booster is in fluid communication with the first chamber portion, and the second volume booster is in fluid communication with the second chamber portion, and opening of the bypass valve allows a pressure in the first and second chamber portions to equilibrate.

14. The bypass arrangement of claim 10, further comprising:
- a positioner;
- a first line from the positioner to the first volume booster; and
- a second line from the positioner to the second volume booster;
- wherein the positioner signals one or more of the first and second volume boosters by supplying pressurized fluid through the first and second lines.

15. The bypass arrangement of claim 10, wherein the actuator is a piston actuator.

* * * * *